E. E. HICKEN
TENDER
May 12, 1931.
Re. 18,066
Original Filed Jan. 30, 1929 3 Sheets-Sheet 1
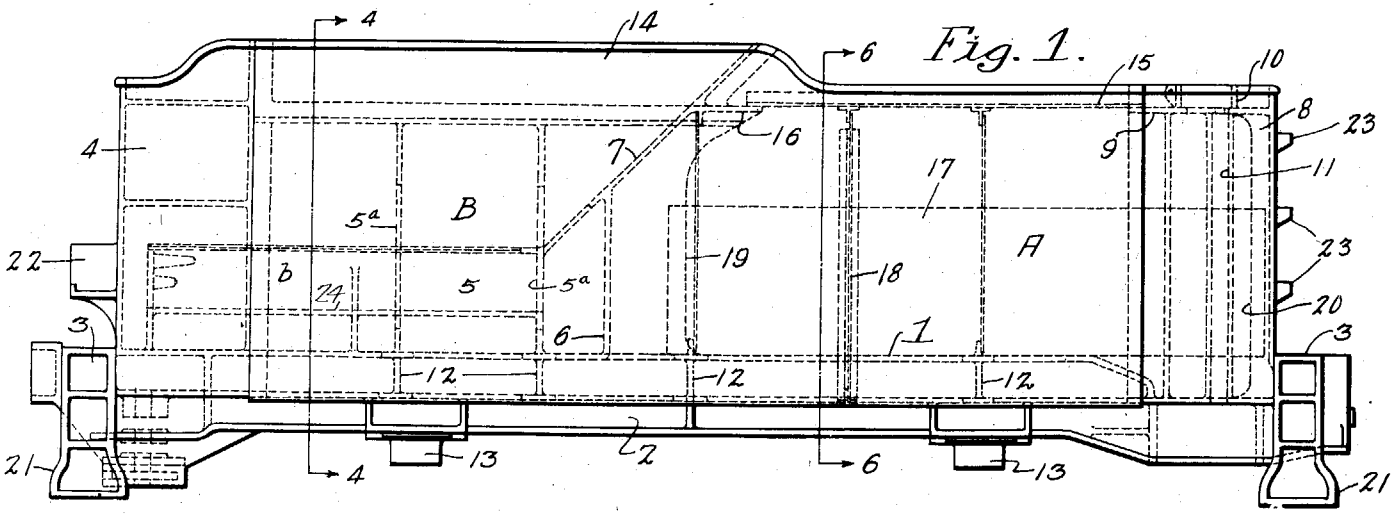
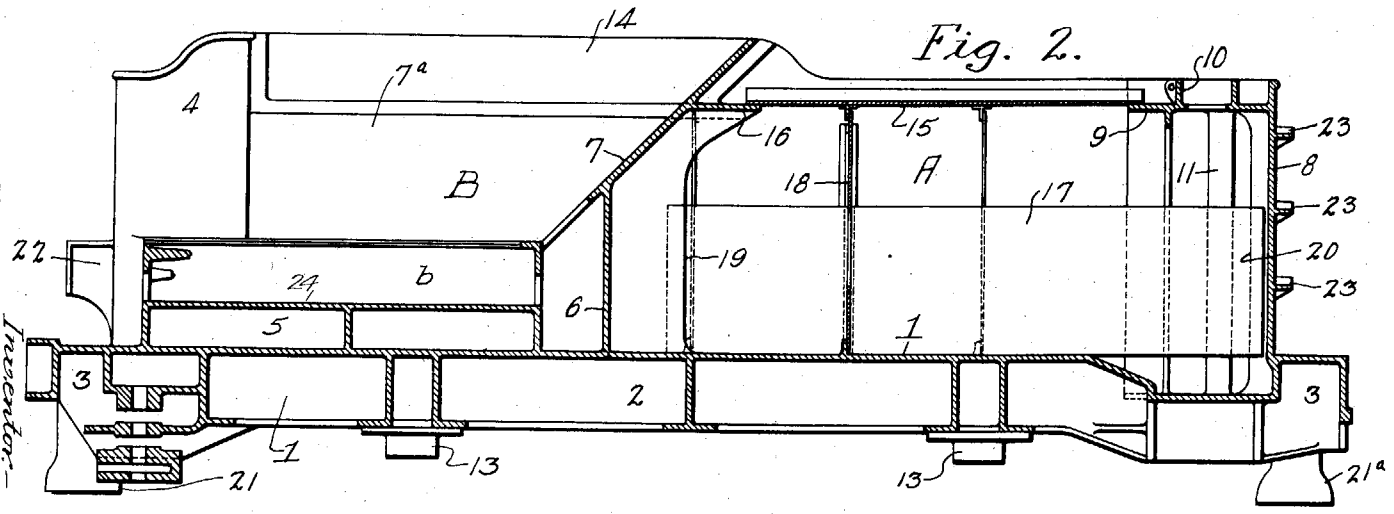
Inventor—
Elmer E. Hicken
by his Attorneys
Hooston & Hewson

E. E. HICKEN

TENDER

May 12, 1931.

Re. 18,066

Original Filed Jan. 30, 1929

3 Sheets-Sheet 2

Inventor-
Elmer E. Hicken
by his Attorneys
Howson & Howson

E. E. HICKEN

TENDER

May 12, 1931.

Re. 18,066

Original Filed Jan. 30, 1929 3 Sheets-Sheet 3

Inventor
Elmer E. Hicken
by his Attorneys
Howson & Howson

Reissued May 12, 1931 Re. 18,066

UNITED STATES PATENT OFFICE

ELMER E. HICKEN, OF COLLINGSWOOD, NEW JERSEY

TENDER

Original No. 1,734,808, dated November 5, 1929, Serial No. 336,167, filed January 30, 1929. Application for reissue filed March 25, 1931. Serial No. 525,284.

One object of my invention is to make the base and end walls of a locomotive tender body in a single casting.

A further object is to make the partitions separating the fuel section from the water section integral with the base and front walls of the tender.

And a still further object is to make the conveyor trough an integral part of the frame.

The invention also relates to certain details described hereinafter.

In the accompanying drawings:

Fig. 1 is a side view of my improved locomotive tender body;

Fig. 2 is a longitudinal sectional view on the line 2—2, Fig. 3;

Figure 3:
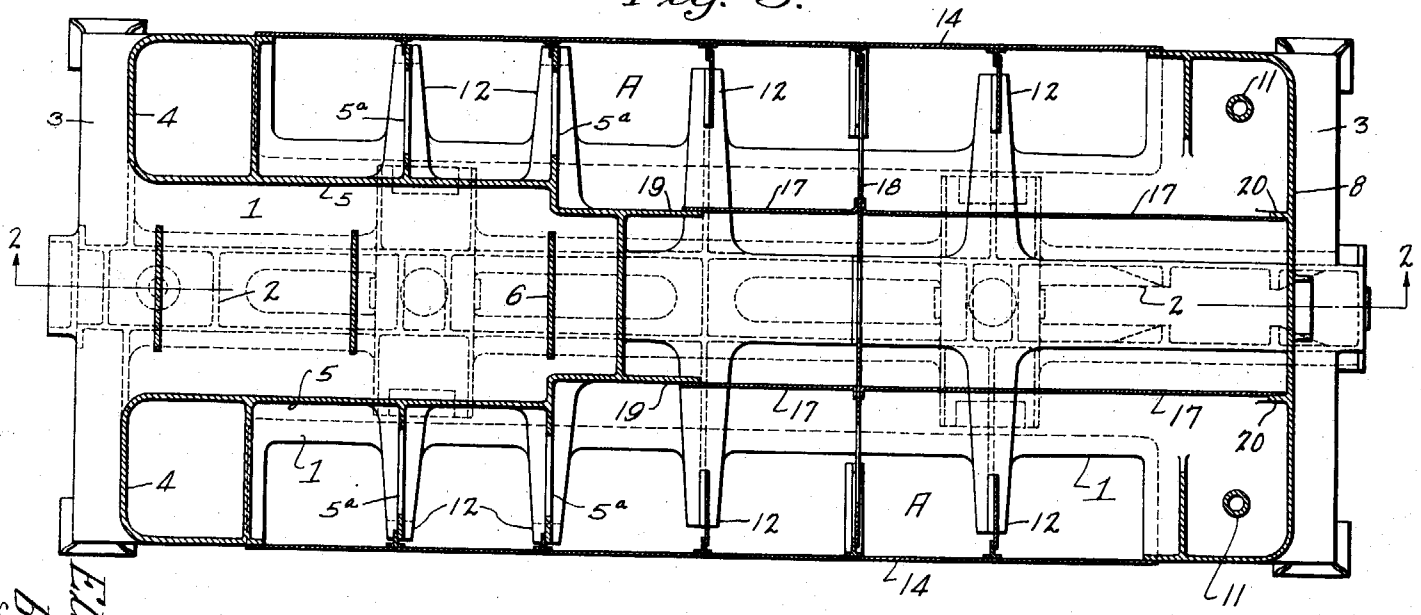
Fig. 3 is a sectional plan view, on the line 3—3, Fig. 4.
Figure 7:
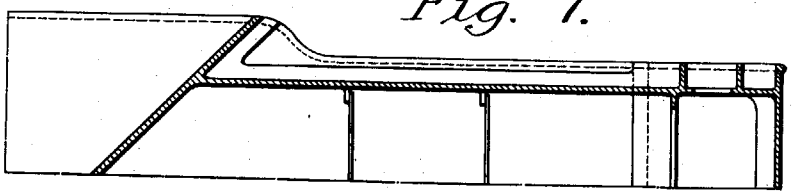
Fig. 7 is a longitudinal sectional view showing the top cast integral with the rear end.
Figure 4:
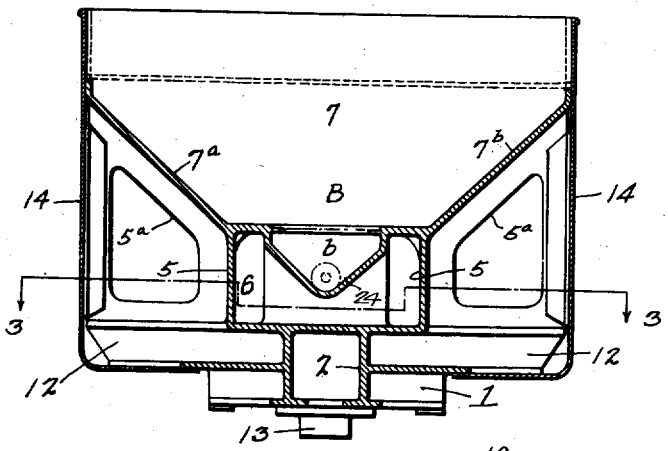
Fig. 4 is a sectional view at the front end of the tender body, on the line 4—4, Fig. 1.
Figure 5:
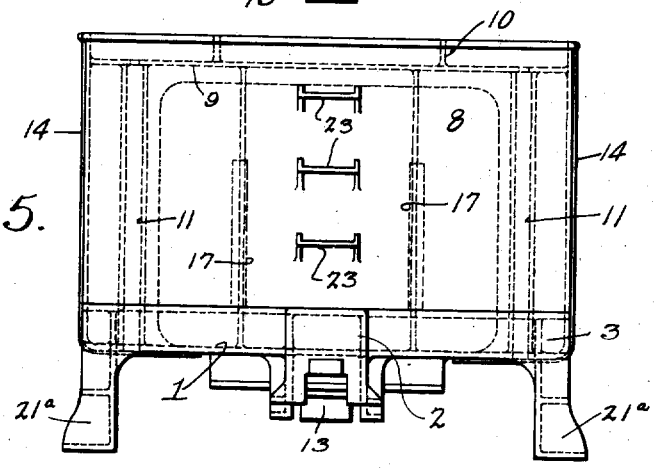
Fig. 5 is a rear view of the tender body.
Figure 6:
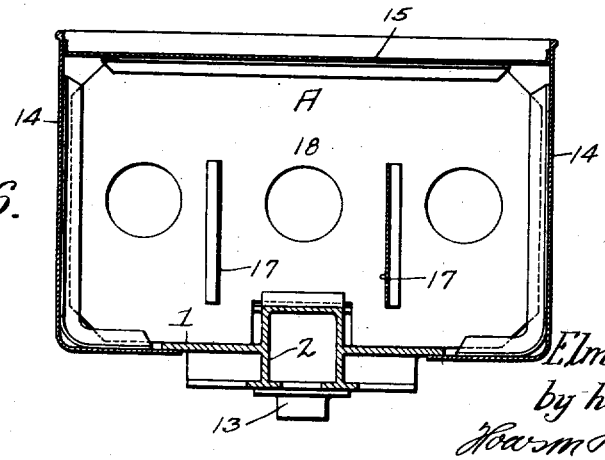
Fig. 6 is a transverse sectional view on the line 6—6, Fig. 1.

The base 1 of the tender body has a longitudinal box-like girder 2 extending the full length of the tender body and joining the transverse end beams 3, which are also made in the form of hollow beams. 4—4 are the front ends of the body, spaced apart to provide access to the fuel section of the tender body.

In the present instance a space *b* is provided for an automatic stoker at the bottom of the fuel section B. The side walls 5 and the end walls 6 of the space *b*, the trough 24 for the screw conveyor, as well as the inclined walls 7, 7*a* and 7*b* of the fuel section B, are cast integral with the base 1 and ends 4.

Reinforcing ribs 5*a* are cast integral with the base 1 and extend from the walls 5 and 7*a* and 7*b* to the sides of the tender.

The rear end wall 8 is also cast integral with the base. At the upper end of the rear end wall 8 is an integral roof extension 9, in which is a funnel 10 through which water is supplied to the water section A of the tender. In the present instance overflow pipes 11 are cast integral with the base 1 and roof extension 9.

The base 1 has lateral integral ribs 12 spaced a given distance apart, and on the underside of the base are centre bearings 13 or pads for centre bearings. The centre bearings rest upon the bearings on the truck, on which the tender body is mounted.

All the parts mentioned above form an integral skeleton frame, to which the side plates 14—14 and roof plate 15 are secured by rivets or other fastening means. The side plates in the present instance extend under the ribs 12 and under the front and rear ends of the tender body as shown and are secured thereto by rivets or by welding. The side plates are also secured to the reinforcing ribs 5*a* and to the flanged upper edge of the inclined walls 7*a* and 7*b*.

The roof is made in the present instance of a single plate 15. The plate 15 extends over the main portion of the water section A and is secured to the rear end and its extension and to the side plates 14—14, and rests at the front end upon a bracket 16 formed integral with the inclined rear wall 7 of the section B to which it is secured.

Within the water section A of the tender body are longitudinal dash plates 17 and a transverse dash plate 18. The plates 17 are secured to webs 19, forming part of the casting, and to ribs 20 on the rear end wall 8. The transverse plate 18 is secured to the longitudinal plates and to the side plates of the tender in the ordinary manner and to a flange on the ribs 12 of the base 1.

In the present instance the steps 21—21*a* at each end of the tender body are cast integral with the body, as well as the deck support 22 at the forward end and the treads 23 at the rear end of the tender.

I claim:

1. The combination in a locomotive tender, of a cast metal skeleton frame consisting of a base and ends cast as an integral structure; and separate side plates secured to said structure.

2. The combination in a locomotive tender, of a cast metal skeleton frame consisting of a base and ends cast integral with the base;

and sheet metal sides secured to said skeleton frame.

3. The combination in a locomotive tender, of a cast metal skeleton frame consisting of a base and end members cast integral with the base; separate sheet metal side plates; and a separate roof plate.

4. The combination in a locomotive tender, of a cast metal skeleton frame consisting of a base and end members cast integral with the base; sheet metal side plates; and a sheet metal roof plate, said side plates extending under the base and secured thereto and to the integral ends of the skeleton frame.

5. The combination in a locomotive tender, of a cast metal skeleton frame consisting of a base having laterally projecting ribs spaced a given distance apart; two front ends and a single rear frame forming the ends of the tender body; sheet metal plates forming the sides of the tender body and secured to said ends, said plates extending under the ribs of the base and secured thereto; and a top plate covering the water section of the tender and secured to the side plates and to the ends of the skeleton frame.

6. The combination in a locomotive tender, of a skeleton frame consisting of a base, ends and partitions separating the water section from the fuel section, said parts being cast as an integral structure, metallic side plates extending to both ends of the frame and secured to said ends and to the base and the partitions; and a top plate secured to said side plates and to the ends and the partitions of the skeleton frame.

7. The combination in a locomotive tender, of a skeleton frame consisting of a base, and end members, said members forming the ends of the water section of the body, the rear end having an integral roof section; and partition plates separating the water section from the fuel section, the inclined rear partition having a bracket.

8. The combination in a locomotive tender, of a cast metal skeleton frame consisting of a base and a forward end frame cast integral therewith, including the partitions which separate the fuel section from the water section.

9. The combination in a locomotive tender, of a cast metal skeleton frame consisting of a base and a forward end frame cast integral therewith, including the partitions which separate the fuel section from the water section and the trough of the stoker mechanism.

10. The combination in a locomotive tender, of a cast metal skeleton frame consisting of a base, a forward end frame including the partitions separating the fuel section from the water section, and a rear end frame, the whole formed in a single casting.

11. The combination in a locomotive tender, of a cast metal skeleton frame consisting of a base, a forward end frame including the partitions separating the fuel section from the water section, and a rear end frame, the whole formed in a single casting; and separate side plates secured to the base and the end frames.

12. The combination in a locomotive tender, of a cast metal skeleton frame consisting of a base; a partition separating the fuel section from the water section; and a trough for a stoker mechanism, cast integral with the skeleton frame.

13. The combination in a locomotive tender, of a cast metal skeleton frame; and a stoker trough at one end of the frame, cast integral therewith.

14. A locomotive tender underframe, including a stoker conveyor trough integral therewith.

15. In a device of the class described in an integral underframe, horizontal wall elements forming the bottom of a coal compartment and spaced from each other, and a trough-shaped member connecting said walls and depending therefrom.

16. The combination in a locomotive tender, of a cast metal skeleton frame; a stoker trough at one end of the frame and inwardly projecting guides for plates, which are slidably mounted on said guides, the entire structure being formed as an integral casting.

17. The combination in a locomotive tender, of a cast metal skeleton frame; a stoker trough at one end of the frame and a coal crusher element at the forward end of the trough and formed integral with the trough and the skeleton frame.

ELMER E. HICKEN.